Fig. 1.

INVENTORS
Roy S. Sanford
James O. Eames

Jan. 28, 1958  R. S. SANFORD ET AL  2,821,272
FLUID PRESSURE BRAKE SYSTEM

Filed Dec. 14, 1954  5 Sheets-Sheet 2

Roy S. Sanford
James O. Eames
INVENTORS

BY
ATTORNEYS

Roy S. Sanford
James O. Eames
INVENTORS

BY
ATTORNEYS

United States Patent Office 2,821,272
Patented Jan. 28, 1958

2,821,272

FLUID PRESSURE BRAKE SYSTEM

Roy S. Sanford and James O. Eames, Seymour, Conn., assignors to Roy S. Sanford, Woodbury, Roger H. Casler and James O. Eames, Washington, and Wilfred A. Eaton and Erling D. Sedergren, Woodbury, Conn.

Application December 14, 1954, Serial No. 475,017

25 Claims. (Cl. 188—264)

This invention relates to frictional mechanisms, hereinafter generally referred to as brake mechanisms, and more particularly to fluid pressure operated and fluid cooled mechanisms of this type.

The excessive heat developed during the operation of such mechanisms has caused difficulties in the past, and it is one of the objects of the invention to provide means for overcoming these difficulties.

Another object is the provision of novel brake cooling means.

Yet another object is the provision of novel frictional mechanism adapted for cooling by means of a circulating fluid.

Another object is the provision of brake cooling and actuating mechanism associated with the cooling system of a vehicle engine.

A further object is the provision of novel control valve means for a power operated brake.

Yet another object is the provision of means for effecting manual operation of the brake in the event of power failure.

Still another object is the provision of means for reducing the power required by the pump when the valve is released.

These and other objects of the invention will be more readily apparent from the following detailed description when taken in connection with the accompanying drawings. It is to be expressly understood, however, that the description and drawings are not to be taken as defining the limits of the invention, reference being had for this purpose to the appended claims.

Figure 1:
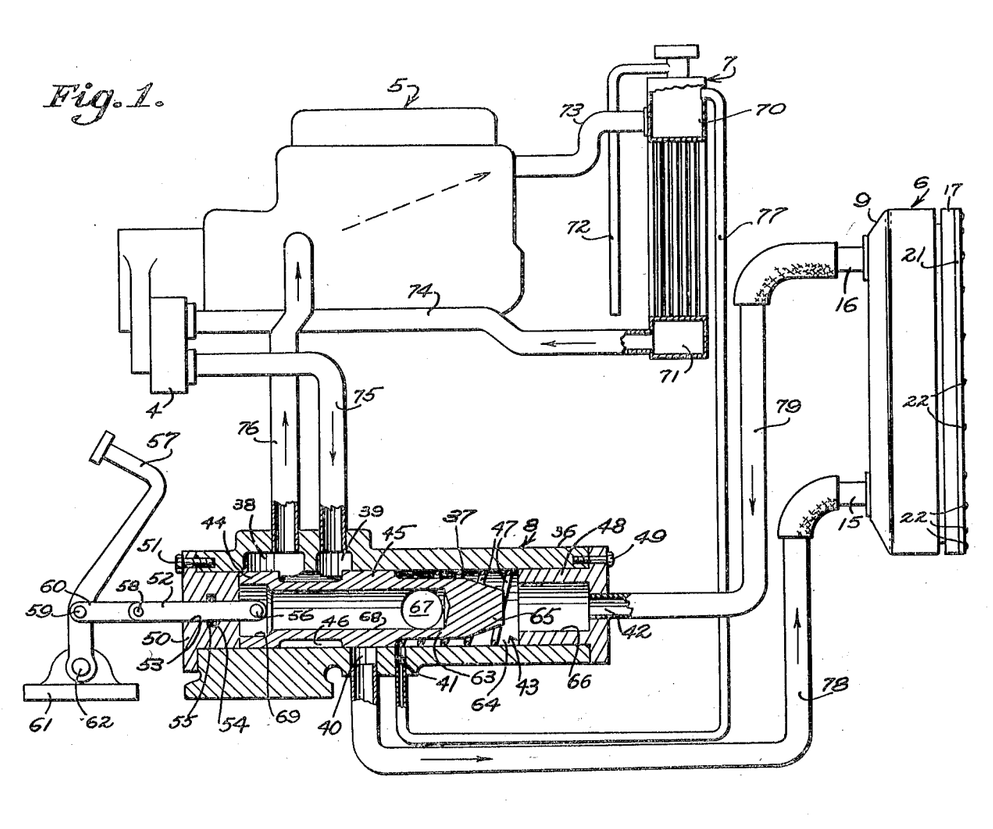
Fig. 1 illustrates diagrammatically and partially in section, brake mechanism constructed in accordance with the principles of the invention.

Fig. 1 includes in general an engine cooling pump 4 driven by a vehicle engine 5 in any suitable manner, not shown, a brake actuator 6, to be described more fully hereinafter, a cooling radiator or heat exchanger 7, and a pedal operated brake control valve 8. These elements are connected by suitable conduits, as will be set forth more fully in connection with the description of the system.

Figures 2, 3:
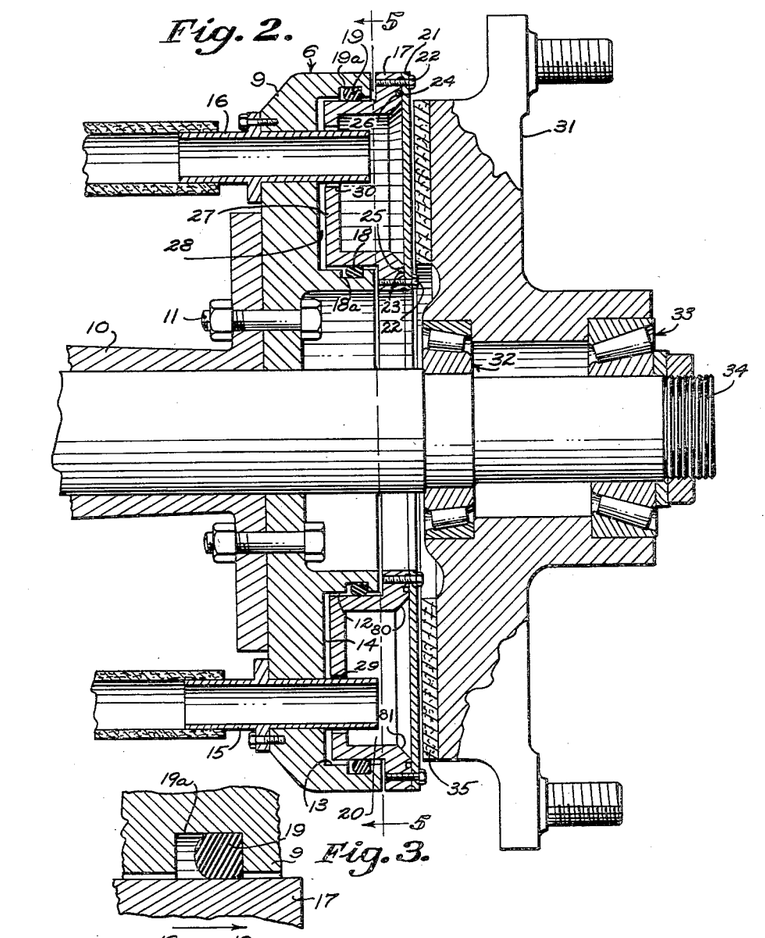
Fig. 2 is a sectional view of one form of brake actuator mechanism.
Fig. 3 is a partial sectional view of the brake adjusting and retracting mechanism with the brake in applied position.

Referring now to Fig. 2, brake actuator 6 comprises an expansible chamber which includes an annular cylinder 9 secured against rotation to an axle housing 10 by means of bolts 11. The annular cylinder has inner and outer walls 12 and 13 concentric with the axis of the axle housing, the cylinder being open at the right end and closed at the left end by a wall 14 integral with the cylinder walls. Inlet and outlet conduits 15 and 16 are secured to the wall 14 and extend there through and into the interior of the cylinder as shown. A rigid annular piston 17, which may be made of suitable material such as cast irons, steel, plastic, or the like, is mounted in the cylinder for sliding movement axially thereof on a resilient sealing ring 18 positioned in groove 18a in the inner cylinder wall and a resilient sealing ring 19 positioned in groove 19a in the outer cylinder wall, the rings being compressed between the bottoms of the grooves and the corresponding piston walls in sliding frictional engagement with the latter and being of flexible, resilient rubbery material formed of a natural or synthetic rubber composition. The piston 17 has an open ended annular channel or chamber 20 for circulation of a cooling liquid, and the channel is closed at the right end by a separate, relatively thin, flat and flexible friction plate 21, of metal having a high heat conductivity and secured at its inner and outer peripheries to the end of the rigid piston as by means of cap screws 22. Thus the friction plate forms a part of the piston and moves bodily therewith, the mechanical force exerted by the piston being applied to the plate only on its inner and outer peripheral portions, and the plate itself being a pressure responsive member carried by the piston. This construction permits the braking torque to be transmitted from the thin friction plate to the rigid piston through the peripheral portions secured thereto as above described, and the torque is transmitted to the cylinder and axle housing by means to be described in detail hereinafter. Sealing rings 23 and 24 are disposed in grooves 25 and 26 in the right end of the piston and in sealing engagement with the friction plate. The piston has a back wall 27, which forms in connection with cylinder 9, an annular chamber 28. Enlarged apertures 29 and 30, through which conduits 15 and 16 pass, serve to connect piston channel 20 and chamber 28. The piston is prevented from rotating in the cylinder by suitable means, to be described hereinafter.

A wheel 31 is rotatably mounted by means of bearings 32 and 33 on an axle tube 34 carried by axle housing 10, the bearings serving to prevent movement of the wheel axially of the shaft in either direction. An annular friction ring 35 is adhesively or otherwise secured to the wheel for rotation therewith as shown, and positioned for engagement by the friction plate 21 on movement of the piston 17 to the right. The composition of the ring 35 is preferably such as to possess relatively low heat transfer qualities. In general, such compositions are composed of fibrous asbestos combined with conventional friction modifying and augmenting materials and a heat hardenable or curable organic binder material such as thermal setting resin, i. e., a phenol formaldehyde. Such compositions will be referred to hereinafter as composition friction materials.

Referring again to Fig. 1, brake valve 8 includes a casing 36 having a bore 37 extending therethrough. The casing is provided on its upper side with spaced ports 38 and 39, on its lower side with spaced ports 40 and 41, and at its right end with a port 42. A spool valve member 43 is slidably mounted in bore 37, and is provided with spaced lands or valves 44 and 45 with a wide annular groove 46 therebetween. A return spring 47 is interposed between the right end of land 45 and the left face of a plug 48 carried in the right end of bore 37 and secured to the casing 36 by screws 49, and serves to normally maintain the left end of the valve member 43 in engagement with a plug 50 carried in the left end of the valve bore and secured to the casing by screws 51. A valve operating rod 52 is slidably mounted in a bore 53 in the latter plug, and is sealed by a sealing ring 54 carried in a groove 55 formed in the plug. The rod 52 is connected to the spool valve member 43 by a pin 56, and is connected to a brake pedal 57 by pins 58 and 59 and a link 60. The pedal is pivotally mounted on a suitable bracket 61 by a pin 62. The spool valve member 43 is provided with an elongated portion 63 of reduced diameter at the right of land 45, which forms, in connection with bore 37 and end plug 48, a chamber 64. The right end of member 43 has a tapered valve portion 65 adapted on movement to the right to enter and restrict the area of a port 66 in the end plug 48. Chamber 64 is connected to the valve bore at the left end of valve member 43 by a port 67 and passages 68 and 69 in the member.

The radiator 7 is provided with upper and lower tanks 70 and 71. The upper tank is vented to atmosphere by a conduit 72, and is connected to the upper part of the water jacket of engine 5 by a conduit 73. The lower radiator tank is connected to the suction side of the pump 4 by a conduit 74, the outlet 70 and 71. The upper tnak is vented to atmosphere by a conduit 73. The lower radiator tank is connected to the suction side of the pump 4 by a conduit 74, the outlet side of the pump being connected to the valve port 39 by a conduit 75. The lower part of the engine water jacket is connected to valve port 38 by a conduit 76, and with the engine running and the valve parts in the position shown, the pump 4 draws liquid from the bottom of the radiator through conduit 74, and forces it into the top of the radiator through conduit 75, valve port 39, spool valve channel 46, port 38, conduit 76, engine 5, and conduit 73. The valve spool land 44 cuts off port 38 from passage 69 in the valve spool, which passage is connected to chamber 64 by passage 68 and port 67, and ports 38 and 39 are both cut off from port 40 by valve spool land 45. Consequently, valve ports 40 and 42, which are connected to the brake as will be hereinafter described, are isolated completely from the engine cooling system. In the event there is any leakage of cooling liquid past valve land 45 which would tend to build up pressure in the valve chamber 64, this leakage liquid is vented to the upper radiator tank 70 through open port 41 and a vent conduit 77 connected to the upper tank. Since the tank is vented to atmosphere through conduit 72, the valve chamber 64 remains at substantially atmosphere pressure, and no appreciable pressure can be built up in conduits 78 and 79 which serve respectively to connect valve ports 40 and 42 with brake actuator inlet and outlet conduits 15 and 16.

In the event it is desired to apply the brake, the pedal is depressed to move the valve spool to the right. As the valve spool 43 moves, vent port 41 is closed by land 45, land 44 uncovers port 38 at the left side and starts to close it off at the right side, land 45 starts to uncover port 40, and thereafter tapered valve portion 65 acts to restrict port 66 at the right end of the valve.

During the first portion of the movement of the spool valve 43 to the right, the engine cooling liquid can still circulate directly from port 39 to port 38 through valve groove 46, and a portion of the liquid also circulates through the brake from port 39 through groove 46, port 40, conduits 78 and 15, conduits 16 and 79, port 42 and bore 66 into chamber 64 past tapered valve portion 65, and back to pump 4 through port 67, valve spool passages 68 and 69, port 38, conduit 76, engine 5, conduit 73, radiator 7, and conduit 74. The direct flow from port 39 to port 38 through groove 46 is restricted, however, as the valve spool moves to the right, causing more liquid to pass from port 39 to conduit 78 through groove 46 and port 40, and as the valve spool movement continues, tapered valve portion 65 acts to restrict the open end of bore 66 which receives the return flow of liquid from the brake through conduits 16 and 79 and valve port 42. Since the pump is preferably of the positive displacement type, at any given speed, the output of the pump is the same for that speed regardless of the valve spool position, but the pressures at different points in the system are determined by the restrictions in various parts of the system.

The restriction between ports 39 and 38 is increased as the restriction between ports 39 and 40 is decreased, causing more liquid to circulate through the brake system, and at the same time the bore 66 is restricted by the valve portion 65, thus increasing the pressure in the actuator and applying the brake with increasing pressure as the valve is moved further to the right. The return flow of liquid, however, is free to pass to the pump from chamber 64 through port 67, passages 68 and 69, port 38, conduit 76, engine 5, conduit 73, radiator 7, and conduit 74, the liquid passing through the brake actuator thus being cooled by the engine radiator. Although the pump 4 is shown as being driven by the engine, it will be understood that it can be driven by a constant speed electric motor or by any other suitable means. On release of the brake pedal, the brake actuator 6 is again cut off from the liquid circulating system and vented to atmosphere through conduit 77 and radiator vent conduit 72, permitting the brake to release. For a given pump speed, it will be understood that the amount of cooling and actuating liquid circulating through the brake actuator and the pressure of liquid therein will be determined by the position of valve spool 43 in the valve casing. From the foregoing, it will be apparent that the system described permits the use of the engine cooling system to circulate a cooling liquid through the brakes and to pressurize this liquid to apply the brakes. With the brakes released the liquid circulates through the vehicle engine and radiator only, while with the brakes applied, all or part of the liquid circulates through the brakes and through the vehicle engine and radiator.

As heretofore stated, one of the primary objects of the invention is the provision of a brake mechanism so constituted as to effectively dissipate the heat developed during braking, in order to minimize detrimental wear or decomposition of the mating friction elements. This is accomplished by the invention by subjecting the surface of the metallic friction element directly opposite the engaged friction surface of the composition friction material to the action of a circulating liquid, such as water, and generally referred to herein as a cooling liquid, and by providing for uniform engagement of the mating friction elements throughout the entire areas of the engaged surfaces thereof, so that the entire friction surface of the liquid cooled element is effective for heat dissipation, thus eliminating hot spots. This provides a direct transfer of heat through the metallic friction element 21, to the cooling liquid. The heated liquid is circulated through and cooled in a heat exchanger, and then recirculated through channel 20 to cool plate 21. The rate of heat transfer increases as the plate thickness is decreased, and consequently the cooling characteristics are materially improved by the use of a thin plate. Such plates, which are of metal of good heat conductivity, are preferably made separate from the piston 17, which latter may be of any suitable rigid and stable material. Maximum heat transfer is achieved by making the plates of thin metal. Since the plate 21 is secured to the rigid piston 17 and transmits the braking torque to said piston, it will be understood that the plate 21 must possess sufficient strength to transmit such torque to the piston. Moreover, since the plate 21 is relatively thin it possesses characteristics of flexibility and yieldability under the conditions of operation. Although, as will appear more fully hereinafter, the plate 21 is supported in operation so that no undesirable distortion or bending of the plate will result, the inherent flexibility of the plate enables the latter to more readily conform to the surface of the element 35 so that uniform engagement throughout the areas of contact will result to compensate for any minor non-parallelism between the friction elements 21 and 35. This latter feature insures that no localized areas of engagement will occur which would otherwise result in the development of hot spots and uneven and serious wear of the cooperating braking surfaces. It has been stated hereinbefore that the cooling liquid not only dissipates the heat developed during braking, but also acts upon the piston 17 to apply the brake. Since the plate 21 is in direct contact with the cooling liquid over an area opposite its braking surface, such area cannot be supported mechanically, as by means of the piston, but must be supported by other means. If properly controlled, the liquid in channel 20 may be used for this purpose, the pressure being so controlled in relation to the physical characteristics of plate 21 as to prevent undesirable distortion of the plate when forced against friction ring 35 by the piston 17.

Substantially pure copper, when properly cooled, has been found to be an outstanding friction material for the plate 21. The use of copper is highly desirable since this metal possesses a high coefficient of heat transmission. However, copper is a ductile metal with very little strength, and unless properly cooled and supported, distorts badly when subjected to the stresses resulting from braking. The present invention overcomes such difficulties and permits the use of a thin, flexible and yieldable plate of copper or other metal as a friction element, resulting in a brake with which successive brake applications can be made under the most severe conditions without fading and without overheating and consequent damage to the mating friction elements and other adjacent parts of the brake. As indicated heretofore, other metals may be utilized for the friction plate, and these include silver which has a high coefficient of heat conductivity, as well as good friction characteristics when used against a composition friction material. Thin plates of silver, as well as those formed of any other suitable metal tend to distort badly when subjected to the stresses incurred in braking, unless arranged and supported in accordance with the principles of the invention.

Considering now the operation of the brake actuator, and referring particularly to Fig. 2, liquid enters the chamber 20 of annular piston 17 through conduit 15 and returns to the control valve through conduit 16. Since, in the embodiment shown, the restriction to the flow of cooling liquid from conduit 15 to conduit 16 through chamber 20 is slight compared to that imposed by the control valve, the pressure throughout chamber 20 will be substantially the same for a given control valve setting, and this pressure will also obtain in chamber 28, due to the fact that chambers 20 and 28 are connected by ports 29 and 30 in the rear piston wall. Since the piston is slidably mounted on sealing rings 18 and 19, the pressure in chamber 28 acting on the annular piston area between rings 18 and 19 will act to move the piston to the right to apply the brake, the pressure per square inch in chamber 28 will be substantially identical with that in channel 20 of the piston, and consequently the pressure per square inch on the piston will be the same as the pressure per square inch on plate 21.

The channel at the right end of the annular piston is enlarged as by means of inner and outer circumferential chamfered portions 80 and 81, so dimensioned that the area of the open end of channel 20 is substantially the same as the effective area of piston 17 between rings 18 and 19. Since the end of the channel is closed by the relatively thin and flexible friction plate 21, the area of this plate exposed to the liquid in channel 20, hereinafter referred to as the unsupported portion, is substantially the same as the effective piston area, and the force exerted per unit area on such unsupported portion of the friction plate is the same as that exerted on the piston to move the piston and plate bodily to the right to engage the plate with friction ring 35 on the wheel. The friction ring, in the embodiment shown in Fig. 2, is so dimensioned as to engage the right surface of friction plate 21 on an area directly opposite the unsupported portion of the inner surface of the plate and the friction ring 35 has substantially the same area as the said unsupported inner surface. With such a construction, it will be readily seen that the entire area of frictional contact between the friction plate 21 and the friction ring 35 is subjected to the cooling action of the cooling liquid acting on the surface of the plate directly opposite thereto, when it is recalled that the entire area of the unsupported portion of the inner surface of plate 21, which is opposed to and substantially equal to the frictional engaging area of said plate, is in direct contact with the cooling liquid in chamber 20. It will also be seen that since the effective piston area and the area of the unsupported portion of the plate 21 are substantially the same, the forces acting on these areas, due to the pressure of the cooling liquid, are substantially the same. Thus, as the piston is moved outwardly, in response to fluid pressure in chamber 28, the peripheral portions of the plate 21 will be moved bodily by the cylindrical portion of the rigid piston, and the unsupported portion of the plate 21 will be supported by a fluid pressure force substantially equal to the force effective to move the piston. Since, as heretofore stated, the frictional area of the friction ring 35 is substantially the same as the area of the unsupported portion of the ring 21 and the piston 17, it will be readily understood that when the plate 21 contacts the friction disc 35, the opposing forces per unit area acting on the unsupported portion of the friction plate are substantially balanced and there is no tendency for the flexible plate 21 to distort in either direction due to the action of these forces. This construction permits the use of a relatively thin flexible plate having the ability to conduit heat very rapidly from the interface of plate 21 and friction ring 35 to the circulating liquid in channel 20. This arrangement is particularly advantageous in that it permits the plate 21 to be formed of a ductile and relatively weak material such as copper. Plates of substantially pure copper have been used in a brake of this construction with outstanding success, including plates of ⅛" and ³⁄₃₂" thickness. No appreciable distortion occurred in these copper plates, and the contact between the copper plate and the surface of friction ring 35 was substantially uniform due to the balance of forces maintained on opposite sides of the plate and due also to the aforementioned conformability of the thin plate 21. This was was true even though the energy absorption per unit area was greatly in excess of that commonly used. In other words, since the thin plate 21 is flexible and is subjected to unit pressures due to the pressure of the cooling liquid acting uniformly on the entire left face thereof directly opposite the friction surface, the flexible plate will be forced into engagement with the friction ring so as to secure uniform contact throughout the entire cooperating areas of the ring and plate.

Friction plates having less thickness than that just indicated may be used, the only limitation as to thinness being that the plates must possess sufficient strength to transmit the braking torque to the piston 17 for the particular application. In fact, plates which are inherently non-rigid are definitely advantageous, since they conform more readily to the surface of friction ring 35.

Figure 7:
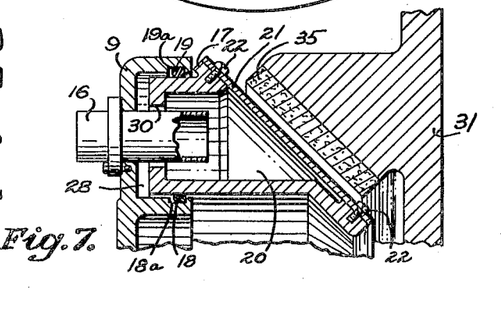
Fig. 7 is a fragmentary sectional view showing a modified form of brake actuator mechanism.

The same principles apply to a cone type brake such as is illustrated in Fig. 7. In this embodiment, wherein parts similar to those of Fig. 2 are identified by the same reference numerals, friction ring 35 is cone-shaped as shown, friction plate 21 on the piston is correspondingly cone-shaped to mate with ring 35, and the right end of piston 17 is shaped to receive the plate, the latter being secured to the piston by screws 22. Here again, as in the case of Fig. 2, the friction plate 21 is separate from the rigid piston 17 and is thin, yieldable and flexible for the same reasons as in Fig. 2. The piston is slidably mounted in cylinder 9 and sealed by rings 18 and 19. Conduit 16, and conduit 15, not shown, connect channel 20 of the piston with the circulating liquid system as was the case in the structure illustrated in Fig. 2, and a chamber 28 is formed between the cylinder and piston and connected to channel 20 by port 30 and port 29, not shown. Thus it will be seen that the actuator operates in the same manner as the actuator in Fig. 2, an increase of pressure in chamber 28 serving to move the piston to the right to effect frictional engagement of friction plate 21 with friction ring 35 carried by wheel 31, and the liquid circulating through channel 20 serving to cool the plate 21. It will also be apparent that the operation of the actuator of Fig. 2 is identical to the operation of the actuator of Fig. 7, the only difference in construction being that in Fig. 2 the plate 21 is parallel to the left face of the piston 17 whereas in Fig. 7, these parts are angularly related.

As was the case in the structure of Fig. 2, the open end of channel 20 is so dimensioned that on engagement of a portion of the right surface of plate 21 with friction ring 35, a corresponding portion of the left surface of the plate directly opposite to the portion engaging ring 35 is exposed to the action of the cooling liquid in channel 20 and is unsupported except for the force exerted thereon by the liquid in the channel. In order to avoid distortion of the plate 21 due to its engagement with ring 35, it is desirable, as heretofore stated, that the mechanical force per unit area acting on the right surface of the plate normal thereto be substantially the same as the force per unit area exerted by the liquid in channel 20 normal to the corresponding left surface of the plate. To this end, the area of the annular piston is made substantially the same as the projected area of the annular opening of channel 20 at the right end of the piston, and in any case such that any force exerted on the right surface of the plate normal thereto is substantially balanced by a corresponding force exerted on the left surface of the plate normal thereto by the liquid in channel 20. In this embodiment, as was the case in the structure illustrated in Fig. 2, the ring 35 is preferably so dimensioned as to engage an outer portion of the plate 21 of substantially the same area as that of the unsupported left surface of the plate and directly opposite thereto, the entire left surface of the plate directly in line with the right surface engaged with ring 35 thus being in direct contact with the liquid in channel 20. An advantage of employing the cone type brake of Fig. 7 is that an increased braking area is secured as well as a corresponding increased area of the plate 21 which is subjected to the direct action of the cooling liquid, such advantage being secured without the necessity of correspondingly increasing the effective piston area.

Figure 8:
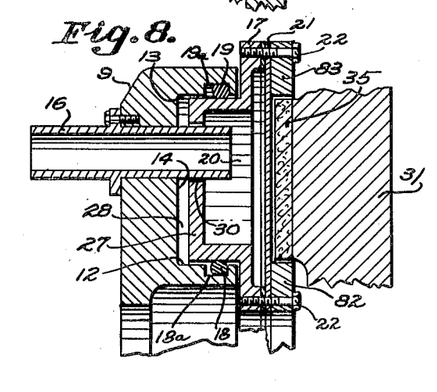
Fig. 8 is a fragmentary sectional view of still another form of brake actuator mechanism.

Another modification of the brake actuator is illustrated in Fig. 8, wherein parts similar to those of Fig. 2 are identified by similar reference characters. The construction of this figure also includes an annular cylinder 9, and the piston 17 is slidably mounted therein and sealed by rings 18 and 19. The piston has a cooling liquid channel 20 and a relatively thin and flexible friction plate 21 secured to the right end thereof as will be more fully described. Channel 20 and chamber 28 are connected by port 30 and port 29, not shown, and conduit 16 and conduit 15, not shown, connect the actuator with the liquid system heretofore described, liquid being circulated through channel 20 in the same manner as in Fig. 2.

In the structures shown in Figs. 2 and 7, the construction has been such that the area of the piston and the projected areas of the open end of piston channel 20 and the friction ring 35, have been substantially the same. In Fig. 8, however, this is not the case, the area of the channel 20 at its open end being appreciably greater than that of the piston and of the friction ring 35, the total area of friction plate 21 being correspondingly greater as shown. In this figure, the friction plate is secured to the open end of the annular piston by inner and outer rigid annular clamping rings 82 and 83 fastened to the piston by bolts 22. The clamping rings are so dimensioned as to form an annular channel concentric with the piston and of substantially the same area as the latter, this channel being adapted, as shown, to receive the friction ring 35 with a slight clearance between the rings 82 and 83 and the friction ring. The ring 35, however, has substantially the same area as piston 17. Since that portion of the friction plate which is subjected to liquid pressure on one side, is effectively supported on the other side during a brake application by the annular clamping rings 82 and 83 and brake friction ring 35, it will be clear that the mechanical force per unit area acting on one side of the friction plate is substantially balanced by the liquid pressure force per unit area exerted on the other side. The area of the plate 21 subjected to the action of cooling liquid in channel 20 in this form of the invention, is much greater than that in frictional engagement with ring 35, resulting in greater transfer of heat to the cooling liquid, due to the radial flow of heat both inwardly and outwardly in the plate.

Figure 5:
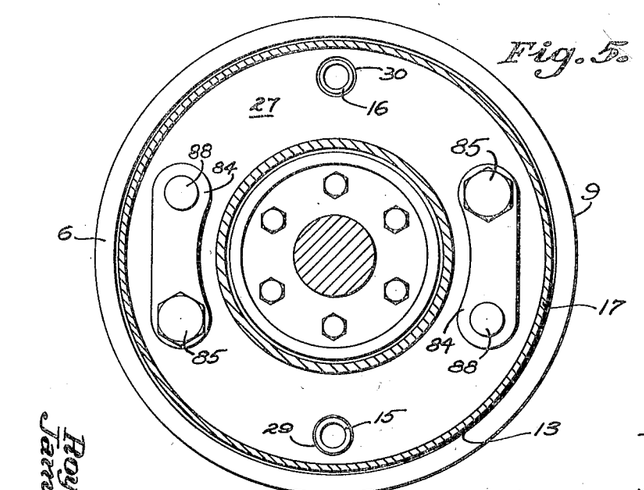
Fig. 5 is a plan view, partially in section, of the brake shoe torque transmitting mechanism, taken along line 5—5 of Fig. 2.
Figure 6:
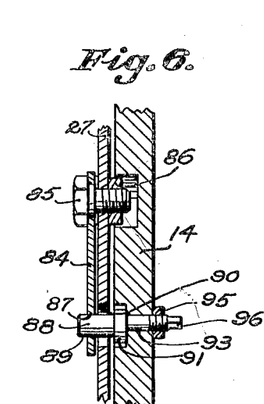
Fig. 6 is a fragmentary sectional view of the mechanism of Fig. 5.

As stated heretofore, means are provided for preventing rotation of the piston in the cylinder due to the braking torque, and such means are illustrated in Figs. 5 and 6. A pair of oppositely disposed torque links 84 are pivotally mounted at one end as shown, on studs 85 parallel to the cylinder axis and secured to back wall 27 of piston 17 by nuts 86, the opposite ends of the links having bores 87 in sliding engagement with studs 88 secured to the end wall 14 of the cylinder parallel with studs 85, and having cylindrical portions 89 extending through enlarged bores 90 in the back piston wall 27. A collar 91 formed on the stud is housed within a recess formed in the rear wall of the cylinder, and a cylindrical portion 93 eccentric with respect to stud portion 89, extends through a bore in the wall 14 and is secured by a nut 95 as shown. A square portion 96 at the right end of the stud accommodates a wrench to permit turning of the stud when nut 95 is loosened. Since the stud portions 89 and 93 are eccentric to each other, the distance between the center lines of studs 85 and stud portions 89 can be readily adjusted so that on sliding movement of the piston in the cylinder, the links will be free to slide on stud portions 89. In the event it is desired to have the piston rock slightly about its axis as well as slide in the cylinder, as will be explained more fully hereinafter, the bores 87 may be made slightly larger than the diameters of stud portions 89, and the links may be slightly flexible if desired, so as to permit limited universal rocking movement of the piston relative to the axis of the cylinder as well as sliding movement in the cylinder, thus insuring more uniform engagement between friction plate 21 and friction ring 35 in the event the engaging face of the latter is disposed at a slight angle to the axis of rotation of the wheel.

Although the use of a circulating fluid for cooling and operating the brake has been referred to, it is preferable, for example, that a cooling liquid such as water or a mixture of water and ethylene glycol be used, in which case the pivotal and sliding connections of the torque links are immersed in the liquid and consequently lubricated thereby, thus facilitating the free movement of the piston in the cylinder during brake application and release.

As shown in Fig. 2, the piston can be arranged to float or rock in the cylinder by mounting it on the resilient sealing rings heretofore described, and so dimensioning the parts as to provide an appreciable clearance between the piston walls and the adjacent cylinder walls. The sealing rings 18 and 19 thus perform the dual function of providing a seal and a piston mounting which permits the piston to both rock in and move axially of the cylinder. This takes care of relative run-out of the friction disc 35 and the plate 21 due to normal manufacturing tolerances and insures smooth and efficient brake operation.

In addition to the foregoing, the sealing rings also function as brake shoe return springs and as automatic slack adjusters to maintain a predetermined clearance between friction plate 21 and friction ring 35 with the brake in released position, regardless of wear of the friction ring or the friction plate. Although the resilient rings shown are of the type known as O rings, these being initially cylindrical in cross-section and assuming a shape similar to that shown in Fig. 4 when the rings are compressed between the wall of the piston and the bottom of the groove in the cylinder wall, resilient rings of other cross-sectional shapes may be utilized, provided they are compressed between the relatively movable cylinder and piston members or other relatively movable members, are in sliding frictional engagement with one of the members, are restrained against appreciable movement bodily in at least one direction relative to the other of the members, as by means of grooves or other suitable means, and are installed so as to distort when a force is applied to one of the members to move it relative to the other and so as to spring back to substantially their original shape when the moving force is removed.

Figure 4:
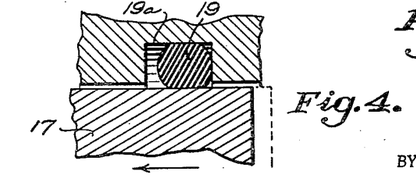
Fig. 4 is a partial sectional view of the mechanism of Fig. 3 with the brake in release position.

Figs. 3 and 4 illustrate the action of the sealing ring 19 during the braking operation, it being understood that the action of the sealing ring 18 is precisely the same. As shown, an O ring 19 is positioned in groove 19a in the wall of cylinder 9, and is compressed between the bottom wall of that groove and the wall of the piston 17, the ring being in sliding frictional engagement with the wall of piston 17, and the groove being so shaped relative to the ring that the latter can distort, as shown in Fig. 3, when the piston is moved to the right in cylinder 9. If the piston is moved by a mechanical force only, the friction force between the piston and ring will be the only force acting to distort the latter, and the ring will, on release of the mechanical force, spring back to its original shape, and the frictional engagement between the ring and piston will cause the latter to move back with the ring. On the other hand, if the piston is moved so as to first distort the ring and then slide through the ring as well, release of the mechanical force will cause the piston to retract through a distance determined by the amount of distortion of the ring, rather than the entire distance through which the piston was moved. Considering the piston and cylinder simply as a pair of relatively movable members moved by the application of mechanical forces only, the amount of retracting movement in one direction will always be that required to restore the ring to its original shape, regardless of the degree of initial movement in the other direction, thus resulting in not only an automatic return spring action but also in an automatic slack adjuster action which retracts the member a predetermined amount regardless of its stroke. This is true regardless of which member is moved relative to the other and regardless of which member is provided with the groove.

In the case of a fluid pressure actuator which comprises a cylinder and piston, however, the situation is different, and if any appreciable amount of fluid pressure is applied to the cylinder to move the piston, the ring groove must be so positioned that the ring distorting force due to the action of fluid pressure thereon acts in the same direction as the ring distorting force due to outward movement of the piston in the cylinder. In other words, as will be more fully explained below, the groove should be in the cylinder wall and the ring should be in sliding frictional engagement with the piston.

Assuming that the groove is in the cylinder as in Figs. 3 and 4, and that fluid under pressure is supplied to the cylinder to move the piston from the position shown in Fig. 4 to the position shown in Fig. 3, both the friction force of the piston on the ring, due to movement of the piston, and the pressure of the fluid on the ring, will tend to distort the latter to the right, somewhat as shown in Fig. 3. As the frictional force is slight, the distortion due to fluid pressure is, if any appreciable pressure is used, greater than that due to friction, and as a result the ring tends to distort to the right relative to the groove 19a. Regardless of the distance through which the piston 17 moves to bring the friction elements 21 and 35 into engagement, it will be clear that the area of frictional engagement between the piston 17 and ring 19 will be moved to the right relative to the groove 19a. On release of the pressure in the cylinder, the piston will retract therein only through a distance corresponding to the degree of distortion of the sealing ring, due to the frictional engagement between the ring and piston. The brake shoe or friction plate 21 is of course connected to the piston for positive movement therewith in either direction, and consequently is, on release of pressure from the cylinder, always returned to a predetermined distance from friction ring 35 determined by the degree of distortion of the resilient ring, regardless of the length of stroke required to initially effect engagement between the friction plate and friction ring. After the initial brake application following installation of the brake mechanism, there will be little if any sliding of the piston in the ring during subsequent applications until the brake elements wear. As such wear occurs, the piston will, on a following application, slide in the ring through a distance substantially corresponding to the degree of wear, and will be retracted through a distance determined by the distortion of the resilient ring, thus resulting in the automatic maintenance of a substantially fixed clearance at all times between the brake friction elements, and at the same time providing automatic release of the brake shoe without the use of return springs. Since the brake system is full of liquid at all times, the pressure in the actuator 6 will increase immediately on operation of the brake valve 8, and the time required to effect a desired degree of brake application will be the same regardless of the degree of brake wear, since the piston stroke will be substantially the same for each brake application, this of course being an essential feature of any automatic slack adjuster. Although this slack adjuster has been illustrated in connection with the liquid control and circulating system shown, it is equally applicable to an actuator operated by a conventional hydraulic master cylinder so constituted as to automatically maintain the cylinder full of liquid as the piston assumes new release positions in accordance with brake wear. It is immaterial, therefore, insofar as the operation of the slack adjuster is concerned, whether the piston of the actuator is operated by increasing the pressure of a circulating liquid or fluid in the cylinder as shown and described, or is operated by increasing the pressure of a non-circulating liquid in the cylinder, as may be done by connecting a conventional hydraulic brake master cylinder to conduit 16 and closing conduit 15 to prevent the escape of liquid therethrough from the cylinder.

In the event that the groove 19a is in the piston 17, the sealing ring 19 will, due to the action of the fluid pressure thereon, be distorted to the right and the area of frictional engagement between the cylinder wall and ring will be moved to the right relative to the groove. Consequently, on release of fluid pressure from the cylinder, it will be impossible for the ring to return to its original undistorted position. On the contrary, the tendency of the ring to return to its undistorted position tends to force the piston to the right to maintain frictional contact between the frictional braking elements. Hence, the brakes will drag when fluid pressure is released. Since a dragging brake is highly undesirable, it will be clear that location of the sealing ring or rings in groove or grooves in the piston will not secure the advantageous results of the invention. It is also pointed out that in the event that parts are reversed, with the piston secured to the axle housing and the cylinder connected to the friction plate 21 and sliding outward on the piston to apply the brake, it is still necessary that the ring grooves be located in the cylinder wall if the automatic slack adjuster feature is to operate as described.

Figures 2A, 2B, 2C:
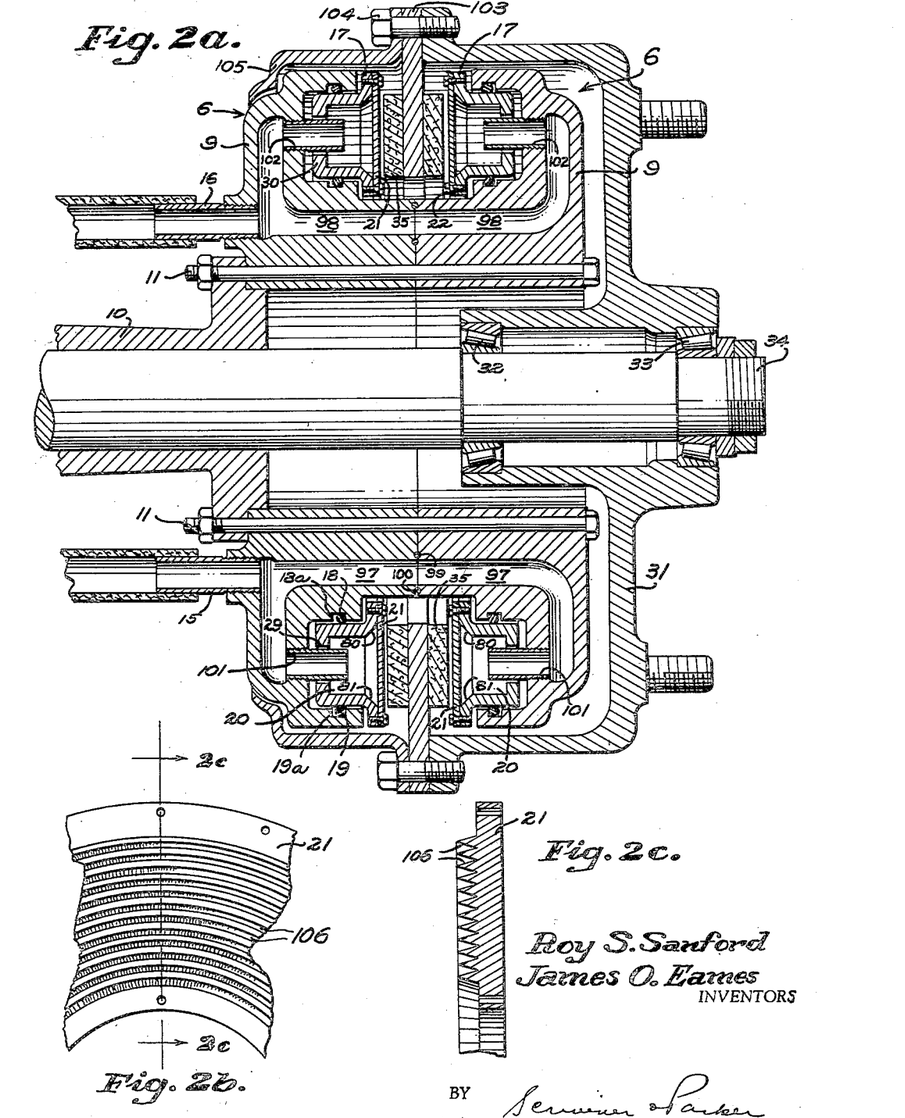
Fig. 2a is a sectional view of another form of brake actuator mechanism.
Fig. 2b is a fragmentary plan view of a modification of one of the friction elements shown in Fig. 2.
Fig. 2c is a cross-sectional view of the friction element shown in Fig. 2b.

The invention is also applicable to multiple disc brakes as well as to single disc brakes, and such a structure is illustrated in Fig. 2a, wherein a pair of actuators 6, similar to the actuator 6 of Fig. 2 are shown, these being so arranged that the thrust of the actuators in opposite directions axially of the wheel is balanced, and consequently no thrust is imposed on the wheel bearings in either direction due to the operation of the brakes.

In the embodiment of Fig. 2a, wherein parts similar to those of Fig. 2 are identified by the same reference numerals, opposed annular cylinders 9 are secured to axle housing 10 in opposed relationship by bolts 11, and have annular pistons 17 slidably mounted therein and sealed against leakage by sealing rings 18 and 19 mounted in grooves 18a and 19a in the cylinder walls. The cylinders are provided with lower and upper inlet and outlet passages 97 and 98 respectively, and with the cylinders assembled as shown, the lower and upper passages are in register, the junctions being sealed by sealing rings 99 and 100 as shown. Nipples 101 and 102 connect the passages 97 and 98 with channel 20 of the pistons, extending respectively through pressure equalizing ports 29 and 30 in the back walls 27 of the pistons. Inlet conduit 15 connects the passages 97 to inlet conduit 78, and outlet conduit 15 connects the passages 98 to outlet conduit 79. As was the case in Fig. 2, the outer ends of channels 20 are enlarged as by means of circumferential chamfered portions 80 and 81, so dimensioned that the areas of the open ends of the channels are the same as the corresponding piston areas. Relatively thin and flexible metal friction plates 21 are secured to the piston ends by screws 22 to form flexible end walls for the channels, and the annular portions exposed to the liquid in the channels and unsupported directly by the pistons have the same area as the pistons. An annular ring 103 is secured to the wheel for rotation therewith by bolts 104, these bolts also serving to secure a dust shield 105 to the wheel. Annular composition friction rings 35 are secured to either side of ring 103 for rotation therewith, each being in alignment with the channel 20 in the adjacent piston and having substantially the same area as the open end of the channel.

When it is desired to apply the brake, a cooling liquid under pressure is circulated through the channels 20 as in Fig. 2, moving the pistons to engage plates 21 with friction rings 35. Since the friction rings and the open ends of the channels have the same area and are in alignment, and since the piston areas are the same as the corresponding channel and friction ring areas, the mechanical forces acting in one direction on the plates due to their engagement of the friction rings by the operation of the pistons are balanced by the fluid pressure forces acting in the other direction on the unsupported annular portions of the friction plates 21, and there is thus no tendency for the flexible friction plates to distort due to these forces, while at the same time the fact that they are flexible and are supported uniformly over the entire area directly in line with friction rings 35 permits them to conform more readily with the friction rings to insure uniform contact between the friction rings and plates. Also, the forces of the opposed pistons are balanced, and there is no tendency for the pistons to distort annular ring 103 or to apply an end thrust in either direction to the wheel bearings 32 and 33. As was the case in Fig. 2, the arrangement of the pistons in the cylinders and the arrangement of sealing rings 18 and 19 insures the desirable floating piston action, the automatic return spring action, and the automatic slack adjuster action. The braking torque of the piston is taken by anchor links as shown in Figs. 5 and 6. Although two brake actuators and two rotating friction discs have been shown, it will be apparent that additional discs may be utilized if desired.

Another novel and important feature of the invention resides in the modified form of friction plate 21 illustrated in Figs. 2b and 2c, wherein the annular portion of the plate subjected to the direct action of the cooling liquid in chamber 20 is provided with a plurality of grooves 106. These grooves may be concentric with the axis of the plate as shown, or may be spiral grooves as desired. Due to the film coefficient, which in this case is a measure of the rate of heat transfer per unit area from the back side of the plate to the cooling liquid, the heat is transferred through the metal friction plate much faster than it can be transferred from the plate to the cooling liquid. The provision of grooves in the back surface of the plate increases the area of the plate in contact with the liquid and thus minimizes the effect of the film coefficient and permits the plate to dissipate much more heat per unit area to the liquid than is the case when each unit of area of one side of the plate in engagement with friction ring 35 is equal to the corresponding unit of area on the other side of the plate in engagement with the cooling liquid.

In the interests of clarity, the thickness of the plate and the depth of the grooves shown in Fig. 2b and Fig. 2c is greater than is considered necessary, although such a groove arrangement could be utilized if desired. Plates were made, however, having an overall thickness of 3/32" and having adjacent concentric V-shaped grooves having an included angle between the sides of the grooves of 30° and a depth of 1/32", as well as plates having a 3/16" overall thickness and V-shaped grooves having a depth of 1/16" and an included angle of 30°. With this arrangement, the area in engagement with the cooling liquid is approximately 3.8 times as great as that of a corresponding area on the outside of the plate in engagement with the friction ring, and a brake having these plates installed was found to have a much greater capacity for dissipating heat than the same brake having a smooth plate without the grooves. The increase in area on the back side of the plate, assuming that V-shaped grooves are utilized, is a function of the included angle rather than the depth of the grooves. Other groove forms may be utilized, or a large number of projections, provided they are so formed that the cooling liquid can contact substantially the entire grooved surface, and provided they are so shaped and arranged as to materially increase the area of the plate in engagement with the cooling liquid. The peripheral portions of the plate which engage the end of the piston are preferably left ungrooved. Although the grooves are shown as extending outwardly from the plane of the peripheral portions of the plate, it will be understood that the grooves may extend inwardly from that plane, and that the peripheral portions may be of any desired thickness, the requirement being that they be of sufficient thickness to permit the plate to be properly secured to the piston and that they have sufficient strength to transmit the braking torque to the piston. Although the depth of the grooves may be varied, they should be shallow enough to permit the circulating cooling liquid to make intimate contact with the grooves over substantially their entire surface. Repeated comparative dynamometer tests showed conclusively that a liquid cooled brake of the type heretofore described having a grooved friction plate 21, could dissipate at least four times as many B. t. u. per square inch per second as a conventional automotive brake without overheating and damaging the composition brake lining, and with less wear on the lining. This was the average heat dissipation for each stop, based on the total amount of energy required to be dissipated during the stop, and such stops were made repeatedly and in rapid succession without the occurrence of appreciable fade and without damage either to the metal friction plate or the composition friction ring.

Figure 9:
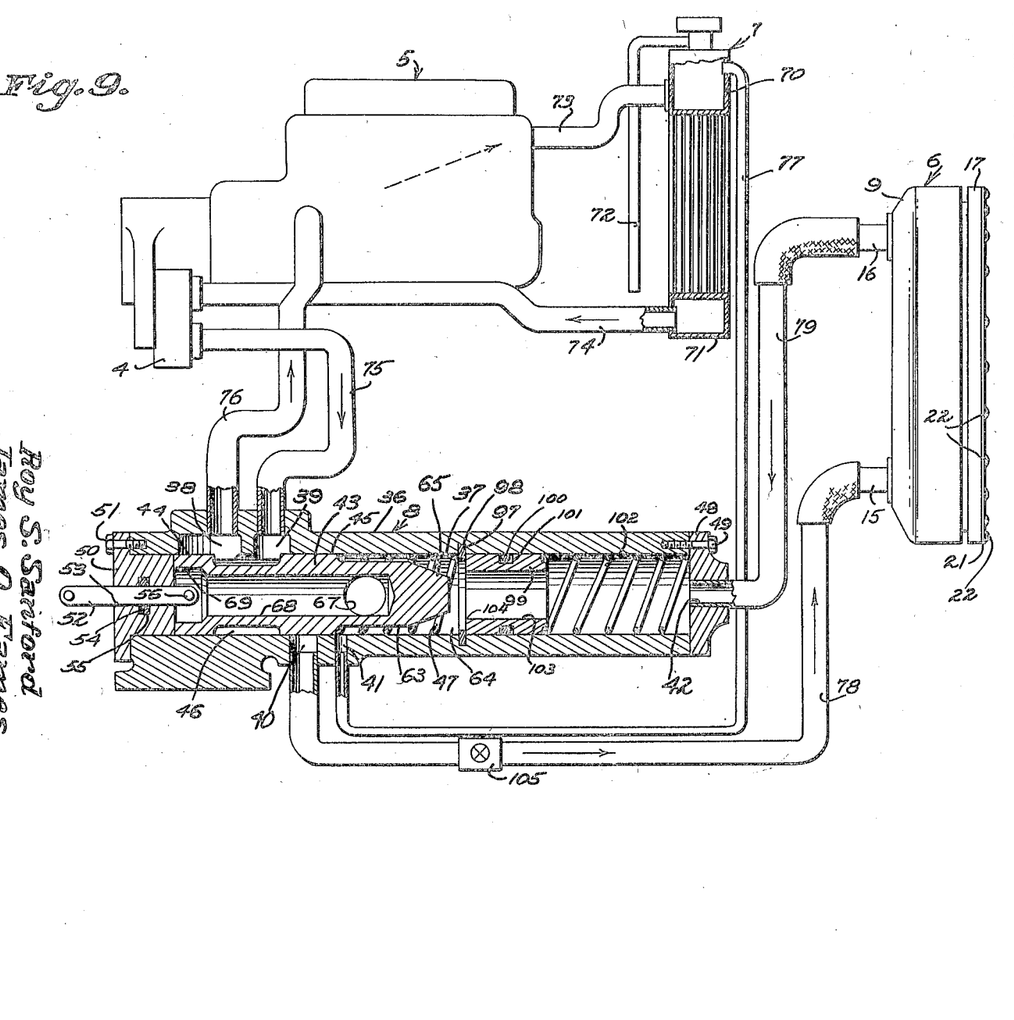
Fig. 9 is a diagrammatic and partial sectional view of a modification of the mechanism shown in Fig. 1.

It is often desirable in power brakes of this type to provide for manual operation in the event of failure of the power supply, and mechanism for accomplishing this desirable end is illustrated in Fig. 9, showing a modification of the control valve of Fig. 1.

The modified valve 8 includes casing 36 having a bore 37 extending therethrough, provided on the upper side with ports 38 and 39, on its lower side with ports 40 and 41, and at the right end with port 42 in end plug or cap 48. A spool valve 43 is slidably mounted in the bore and provided with spaced lands 44 and 45 with a wide groove 46 therebetween. A return spring 47 is interposed between the right end of land 45 and the left face of a snap ring 97 positioned in groove 98 in bore 37. A piston 99 is slidably mounted in bore 37 at the right side of the snap ring, being provided with a sealing ring 100 in groove 101 and normally maintained in engagement with the right face of the snap ring by a spring 102 interposed between the right end of the piston and the left face of end cap 48. A bore 103 extending through the piston is adapted to be restricted by the tapered portion 65 of the spool valve, the left end of the bore forming a valve seat 104 adapted to be engaged and closed by the tapered portion of the spool valve as will be described hereinafter. The inner diameter of the snap ring is so chosen as to be greater than the outside diameter of the elongated portion 63 of the spool valve. The ports are connected to the circulating system in the same manner as shown and described in connection with Fig. 1, but a check valve 105 has been added in conduit 78 arranged to permit the flow of liquid from the valve to the brake actuator 6, but to prevent the flow of liquid in the reverse direction. The spool valve is connected to a suitable brake pedal by the operating rod 52 in the same manner as shown in Fig. 1.

During normal operation, that is, when the pump 4 is operating, the actuator is cut off from the engine circulating system and the liquid in the actuator is maintained at atmospheric pressure due to the action of vent conduits 77 and 72. As the spool valve is moved to the right, more and more of the circulating liquid is bypassed through the actuator as heretofore described, and the pressure of the liquid in the actuator is increased due to restriction of port 103 in position 99 by the action of the tapered portion 65 of the spool valve. There is therefore a pressure differential across piston 99, with the higher pressure being at the right end of the piston, and this pressure, together with the spring 102, serves to maintain the piston in the position shown until such time as the tapered portion of the spool valve engages piston seat 104 and closes off port 103 in the piston.

During normal operation, the piston remains in the position shown, and the operation of the system is identical with that described in connection with Fig. 1. In the event pump 4 stops or fails to pump liquid for any reason, the brake can be operated manually by merely moving the spool valve to the right sufficiently to effect engagement between tapered spool valve portion 65 and piston seat 104, and then continuing the movement to effect movement of the piston to the right. This serves to pump liquid from the right end of valve bore 37 through conduits 79 and 16 to the actuator to increase the pressure therein and apply the brake, and the check valve 105 prevents the escape of liquid from the actuator through conduits 15 and 78. Since the system is normally full of incompressible liquid the actuator starts to apply the brake as soon as the spool valve engages and moves piston 99. The escape of liquid from the actuator is effectively prevented by the check valve 105 and by the engagement of spool valve 43 with the piston seat 104, thus providing for manual operation of the brake in the event of failure of the pump or stoppage of the engine or other pump driving means. The piston 99 can of course be made of any desired area, depending on the amount of liquid displacement required to effect satisfactory manual brake operation.

It will be readily apparent from the foregoing that novel and efficient liquid cooled brake mechanism has been provided together with control means so constituted as to efficiently utilize the vehicle cooling system for the purpose of circulating a cooling liquid to the brake during a brake application, as well as for pressurizing the brake actuator in order to effect a power application of the brake. The control valve of Fig. 1 provides means for normally isolating the brake actuator from the vehicle cooling system and for venting the brake actuator to atmosphere at the same time in order to insure complete release of the brake. Upon operation of the brake pedal, the engine circulating system is connected to the brake actuator, and as the pedal travel increases, an increased amount of the cooling liquid in the engine cooling system is bypassed through the brake actuator, and at the same time the pressure in the actuator is increased in order to apply the brake, due to the restricting action of the control valve spool on the discharge of cooling liquid from the actuator. The arrangement is such that it is feasible to use the cooling system of the vehicle engine as well as the vehicle radiator for the purpose of cooling and pressurizing the liquid passing through the brake actuator, although it is to be understood that if desired, the brake may be actuated by means of a liquid circulating and cooling system which is entirely separate and independent from that of the vehicle engine. In either case, however, the control valve of Fig. 1 provides a graduated and sensitive control of the flow of cooling liquid through the brake actuator, as well as an extremely accurate control of the degree of brake application.

Simple and novel means have also been provided, as illustrated more particularly in Fig. 9 for insuring manual application of the brakes in the event of failure of the pump or the driving means for the pump. In this embodiment of the invention, the first portion of the pedal travel controls the flow of liquid and the pressure of the liquid in the brake in the same manner as described heretofore in connection with Fig. 1, while on further movement of the brake pedal in the event of pump failure, the tapered portion of the spool valve 43 engages the left end of the bore 103 in the piston 99 and closes this opening entirely in order to prevent the escape of liquid from the brake through this port from the discharge conduit 79 of the brake actuator. Thereafter the piston moves to the right with the spool valve on further movement of the latter to the right, and pumps liquid into the brake actuator, the escape of liquid from the actuator through conduit 78 in this case being prevented by the one way check valve 105 interposed in conduit 78. Thus, when the control valve is operating in this manner, no liquid can escape from the system, and the system operates in substantially the same manner as the conventional hydraulically operated brake system. As shown in the drawings, the level of the liquid in the engine and in the radiator is above the actuator and above the control valve, and consequently both the actuator and the valve are maintained full of liquid at all times and the presence of air is excluded, which would otherwise interfere with satisfactory manual operation of the brake.

It is pointed out that the arrangement of the control system is such, that regardless of the position of the spool valve, all of the liquid discharged by the circulating pump passes through the engine radiator, and that any liquid that is bypassed through the brake actuator is also circulated through the engine radiator where it is cooled and then returned to the suction port of the pump.

It is also important in the operation of brakes of this type to provide some sort of reaction on the control pedal in order to permit the operator to properly control the degree of brake application. During power operation only, the movement of the valve spool 43 to the right is opposed by the pressure acting on the right end of the valve, this being due to the pressure drop which takes place across the tapered portion of the valve when it moves to the right to restrict the port 66, and this pressure drop increasing in proportion to the degree of movement of the valve spool to the right. In the case of manual operation on failure of the pump, the piston 99 is directly responsive to the pressure of the liquid in the actuator, and consequently the force exerted on the foot pedal is directly proportional to the degree of the brake application which occurs. This provides a sensitive and highly satisfactory control of the brake under both conditions of operation.

The novel control system permits the use of the vehicle engine cooling system for circulating and pressurizing the cooling liquid in the brake actuator without requiring a larger vehicle radiator, since when the brakes are applied and the radiator is being utilized to cool the brakes, the heat which must be dissipated by the radiator due to the operation of the engine is relatively small. The system is so constituted that the entire output of the pump passes through the radiator regardless of the degree of brake application.

From the foregoing, it will be apparent that the invention is not limited to the specific forms illustrated and described, but may as well be embodied in other equivalent forms within the scope of the appended claims.

What is claimed is:

1. Liquid pressure operated and liquid cool frictional mechanism including a liquid circulating system comprising a pump having suction and discharge ports, a heat exchanger having inlet and outlet ports, and conduits connecting the suction and discharge ports of the pump respectively with the outlet and inlet ports of the heat exchanger, a fluid pressure operated actuator having a chamber for circulating cooling liquid therein provided with inlet and outlet ports and having a pressure responsive member responsive to the pressure of circulating liquid in said chamber, and control valve mechanism connected in series in said circulating system and having separate connections with the inlet and outlet ports of said actuator for controlling the flow of liquid through said chamber and the pressure of liquid therein, said control valve mechanism including a valve operating element having a brake release position and brake applied positions and valve means operable by said element, said valve means operable when the valve operating element is in brake release position to establish the circulation of liquid in said circulating system by the operation of said pump and to prevent the circulation of liquid from said circulating system through said connections, actuator ports, and actuator chamber, and operable on movement of said valve operating element toward brake applied position to direct a portion of the liquid from said circulating system through said actuator connections, actuator ports, liquid chamber, and to said heat exchanger, and to impose a restriction on the flow of liquid from the outlet port of said actuator chamber to the circulating system to increase the pressure of liquid in said chamber to operate said pressure responsive member.

2. Fluid pressure operated frictional mechanism as set forth in claim 1, wherein the control valve mechanism is provided with a port operable with the valve operating element in brake release position to connect the actuator chamber to a low pressure portion of the circulating system, said mechanism being operable on initial movement of said element from release position to close said port.

3. Fluid pressure operated frictional mechanism as set forth in claim 1, wherein the valve mechanism is provided with an atmospheric port connected with the separate connection from said actuator outlet port operable with the valve operating element in release position to vent the actuator chamber to atmosphere through said separate connection, said mechanism being operable on initial movement of said element from release position to close said port.

4. Fluid pressure operated frictional mechanism as set forth in claim 1, wherein said pump is of the positive displacement type.

5. Fluid pressure operated frictional mechanism as set forth in claim 1, wherein said pump is of the positive displacement type, and said control valve mechanism is so constituted as to increase the flow of liquid through said actuator chamber and to increase the pressure of the liquid in said chamber in accordance with the degree of movement of said valve operating element from release position toward said applied positions.

6. Fluid pressure operated frictional mechanism as set forth in claim 1, wherein the cooling liquid chamber is in said pressure responsive member, the outer surface of the outer wall of the chamber being a friction surface, and the opposite surface being in direct engagement with the liquid in said chamber.

7. Fluid pressure operated frictional mechanism as set forth in claim 1, wherein said circulating system includes an internal combustion engine connected in series in the conduit connecting said heat exchanger and pump discharge port.

8. Fluid pressure operated frictional mechanism as set forth in claim 1, wherein said valve means is responsive to the pressure of liquid in said connection between the control valve mechanism and the outlet port of said actuator chamber.

9. Fluid pressure operated frictional mechanism as set forth in claim 1, wherein said heat exchanger is vented to atmosphere, and the control valve mechanism is provided with a port operable for connecting the outlet connection of said fluid chamber to said heat exchanger when the valve operating element is in release position, said valve means being operable to close said port on initial movement of said element from release position.

10. Fluid pressure operated frictional mechanism as set forth in claim 1, wherein the control valve mechanism includes means operable on failure of said pump and on movement of said valve operating element through a predetermined distance from release position to disconnect the outlet port connection of said actuator chamber from said circulating system and to pump liquid into said actuator chamber through said connection to operate said pressure responsive member.

11. Fluid pressure operated frictional mechanism as set forth in claim 1, wherein said control valve mechanism includes means engageable and movable by said valve means on movement of the latter by said valve operating element a predetermined distance from release position to sequentially disestablish communication between the outlet port connection of said actuator and the circulating system and to pump liquid into the actuator chamber through said connection to operate said pressure responsive member.

12. Fluid pressure operated friction mechanism as set forth in claim 1, wherein said control valve mechanism includes means sequentially engageable and movable by said valve means on movement of the latter through a predetermined distance by said valve element to disestablish communication between the outlet port connection of said actuator and said circulating system and to pump liquid into said actuator through said outlet port connection, and valve means associated with the inlet port connection of said actuator for preventing the flow of liquid from the actuator chamber through said inlet port connection to said circulating system.

13. Control valve mechanism including a casing having an inlet port and an outlet port, a second inlet port and a second outlet port, a valve operating element having a release position and movable to applied positions, and valve means operable by said element for controlling the flow of fluid between said ports, said valve means including a first valve for controlling the flow of fluid between said first named inlet and outlet ports and said first named outlet port and second inlet port, a second valve for controlling the flow of fluid through said second outlet port, and a third valve for controlling the flow of fluid through said second inlet port, and said valves being operable with said element in release position to establish communication between the first named inlet and outlet ports and to prevent communication between the second inlet and outlet ports and either of the first named inlet or outlet ports, and operable on initial movement of the element from release position toward applied position to establish communication between the first named outlet port and the second inlet port, and being operable on further movement of the element toward applied position to restrict communication between the first named inlet and outlet ports, establish communication between the first named inlet port and the second outlet port, and restrict communication between the second inlet port and the first named outlet port.

14. Control valve mechanism as set forth in claim 13, wherein the valve casing is provided with an atmospheric port, the second valve being operable in release position to establish communication between the second inlet port and said atmospheric port, and being operable on initial movement of said valve from release position by the operation of said element to close said atmospheric port.

15. Control valve mechanism as set forth in claim 13, wherein said valves are operable on initial movement of said element from release position to establish communication between said second inlet port and said first named outlet port, and are operable on further movement of the element toward applied position to progressively restrict communication between the first named inlet and outlet ports, to progressively open said second outlet port, to establish increasingly unrestricted communication between said second outlet port and said first named inlet port, and to progressively decrease the opening of said second inlet port.

16. Control valve mechanism as set forth in claim 13, wherein said first and second valves are spaced lands on a valve spool having an annular groove therebetween operable for connecting said first inlet and outlet ports with the valve element in released position, the second of said lands serving to close said second outlet port with the valve element in said release position, a bore in said valve spool operable on movement of the spool from release position to permit communication between said second inlet port and said first named outlet port, and a tapered portion on the spool forming said third valve and operable during movement of said spool toward applied position to progressively restrict communication between said second inlet port and said first named outlet port.

17. Control valve mechanism as set forth in claim 13 wherein said casing is provided with a cylindrical bore, a piston slidably mounted in the bore having a port extending therethrough axially of the bore, an abutment for the piston, biasing means for normally maintaining said piston against said abutment with one end of the piston port adjacent said third valve and the other end connected with said second inlet port, said third valve being operable on movement of said element a predetermined distance from release position to engage said piston and close said port in the piston, and being operable on further movement to move said piston bodily to pump fluid from said bore through said second inlet port.

18. Liquid cooled and liquid pressure operated brake mechanism including a brake actuator having a liquid pressure chamber therein, a pressure responsive member associated with the actuator and responsive to the pressure of liquid in said chamber, a metal friction element secured to the pressure responsive member, one side of said friction element being a friction surface and the opposite side being in direct engagement with the liquid in said chamber, inlet and outlet ports in said chamber, and a liquid circulating system comprising a power operated positive displacement pump having discharge and suction ports, a radiator having a lower tank connected with the suction port of the pump and an upper tank having a connection with the discharge port of the pump, and control valve mechanism connected in series in said discharge connection, said control valve mechanism including a valve operating element having a brake release position and movable to brake applied positions, a connection between said control valve and the inlet port of said actuator, a connection between said control valve and the outlet port of said actuator, and valve means operable by said valve operating element operable in brake release position of the last named element for permitting the flow of liquid through the first named connections and radiator and for preventing the flow of liquid through said brake actuator chamber and said connections between the valve and actuator, and operable on movement of said element toward said applied positions to progressively supply increasing amounts of liquid from the discharge port of said pump through said actuator chamber and back to said radiator and to correspondingly impose a restriction on the flow of liquid from said actuator chamber back to said pump in order to increase the pressure of liquid in said actuator chamber to operate said pressure responsive member.

19. Liquid cooled and liquid pressure operated brake mechanism as set forth in claim 18, wherein said valve mechanism is provided with a port having a connection at one end with said upper radiator tank and a connection at the other end with said actuator outlet port connection, said upper radiator tank is provided with an atmospheric vent connection, and said valve means is operable on initial movement of said valve operating element from release position to close said port.

20. Liquid cooled and liquid pressure operated brake mechanism including a brake actuator having a liquid pressure chamber therein, a pressure responsive member associated with the actuator and responsive to the pressure of liquid in said chamber, a metal friction element secured to the pressure responsive member, one side of said friction element being a friction surface and the opposite side being in direct engagement with the liquid in said chamber, inlet and outlet ports in said chamber, and a liquid circulating system comprising a power operated positive displacement pump having suction and discharge ports and a conduit connecting said ports, and control valve mechanism connected in series in said conduit, said control valve mechanism including a valve operating element having a release position and movable to applied positions, a connection between said control valve and the inlet port of said actuator, a connection between said control valve and the outlet port of said actuator, and valve means operable by said element operable in release position of the element for permitting the flow of liquid through said conduit connecting the pump suction and discharge ports and for preventing the flow of liquid through said brake actuator chamber and said connections between the valve and actuator, and operable on movement of said element toward said applied positions to progressively bypass increasing amounts of liquid from the discharge port of said pump through said actuator chamber and back to the suction port of the pump through said valve and conduit and to correspondingly impose a restriction on the flow of liquid from said actuator chamber back to said pump in order to increase the pressure of liquid in said actuator chamber to operate said pressure responsive member.

21. A fluid pressure control system including a cylinder having a piston slidably mounted therein, a chamber for cooling liquid in said piston and inlet and outlet ports for supplying cooling liquid to said chamber and for discharging liquid from said chamber, a heat exchanger having inlet and outlet ports, a positive displacement circulating pump having suction and discharge conduits, the suction conduit being connected to the outlet port of said heat exchanger and the discharge conduit being connected to the inlet port of said heat exchanger, power means for driving the pump, and control valve mechanism for controlling the circulation of liquid in said system by said pump, said control valve mechanism having connections with said pump discharge conduit, said heat exchanger inlet port, and said cooling chamber inlet and outlet ports, said valve mechanism including a movable valve element having a release position and movable therefrom toward an applied position, said valve element being operable in release position to connect said pump discharge conduit and said heat exchanger inlet port and to prevent communication between the pump discharge conduit and the inlet port of said chamber, and being operable during initial movement from release position to establish communication between said chamber outlet port and said heat exchanger inlet port and operable on further movement from release position to progressively restrict said communication between said discharge conduit and heat exchanger inlet port and to simultaneously establish increasingly unrestricted communication between said discharge conduit and said chamber inlet port.

22. A fluid pressure control system as set forth in claim 21, wherein the valve element is operative on movement from release position toward applied position to progressively restrict the flow of liquid from the chamber outlet port to the heat exchanger inlet port and to correspondingly increase the pressure in said chamber, and a portion of the valve element is acted on by the liquid discharged from the chamber through said chamber outlet port to oppose said movement of said valve element from release position.

23. A fluid pressure control system as set forth in claim 21, wherein a check valve is provided in the connection between the control valve and the inlet port of the cooling chamber for permitting the flow of liquid from the control valve to the chamber and for preventing the flow of liquid in the opposite direction, and wherein means are provided operable on movement of said valve element a predetermined distance from release position for pumping liquid from the valve into said chamber independently of the operation of said pump, said means including a cylinder in the valve mechanism connected to the outlet port in said chamber, a piston slidably mounted in said cylinder, and a port extending through the piston, said port being normally open and normally permitting the flow of liquid between the outlet port of the chamber and the discharge conduit of the pump, and being closed by said valve element on movement of the latter a predetermined distance from said release position.

24. A fluid pressure control system including a cylinder having a piston slidably mounted therein, a chamber for cooling liquid in said piston and inlet and outlet ports for supplying cooling liquid to said chamber and for discharging liquid from said chamber, a heat exchanger having inlet and outlet ports, a circulating pump having suction and discharge conduits, the suction conduit being connected to the outlet port of said heat exchanger and the discharge conduit being connected to the inlet port of said heat exchanger, and control valve mechanism for controlling the circulation of liquid in said system by said pump, said control valve mechanism having connections to the said pump discharge conduit, said heat exchanger inlet port, and said cooling chamber inlet and outlet ports, said valve mechanism including movable valve means having a release position and movable therefrom toward an applied position, said valve means operable in release position to direct fluid directly from the discharge conduit of the pump to the inlet port of said heat exchanger and operable on movement away from said release position to increasingly restrict the flow of liquid directly from said pump discharge conduit to said heat exchanger inlet conduit and to direct an increasing flow of liquid directly from said pump discharge conduit to the inlet port of said chamber in said piston and through said chamber, the chamber outlet port and valve mechanism to the inlet port of said heat exchanger.

25. A fluid pressure control system as set forth in claim 24, wherein the system includes an internal combustion engine having the water jacket thereof connected in series in the connection between the control valve mechanism and the inlet port of said heat exchanger, whereby all of the liquid supplied to the control valve from the outlet conduit of said pump passes through the engine water jacket and heat exchanger, regardless of the position of said control valve means.

References Cited in the file of this patent

UNITED STATES PATENTS

| | | |
|---|---|---|
| 1,915,547 | North et al. | June 27, 1933 |
| 1,928,144 | Vickers | Sept. 27, 1933 |
| 2,152,489 | Lamb | Mar. 28, 1939 |
| 2,299,208 | Bloss | Oct. 20, 1942 |
| 2,406,304 | Levy | Aug. 20, 1946 |
| 2,451,335 | Groves | Oct. 21, 1948 |
| 2,484,888 | Hollerith | Oct. 18, 1949 |
| 2,547,254 | Braithwaite | Apr. 3, 1951 |
| 2,716,946 | Hardy | Sept. 6, 1955 |